United States Patent
Chen et al.

(10) Patent No.: US 12,200,711 B2
(45) Date of Patent: Jan. 14, 2025

(54) MULTIPLE PRIORITY CHANNEL MULTIPLEXING

(71) Applicant: ZTE Corporation, Guangdong (CN)

(72) Inventors: Wei Chen, Guangdong (CN); Wei Gou, Guangdong (CN); Jing Shi, Guangdong (CN); Peng Hao, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 17/880,157

(22) Filed: Aug. 3, 2022

(65) Prior Publication Data

US 2022/0394707 A1 Dec. 8, 2022

Related U.S. Application Data

(63) Continuation of application No. PCT/CN2020/074531, filed on Feb. 7, 2020.

(51) Int. Cl.
*H04W 72/21* (2023.01)
(52) U.S. Cl.
CPC .................... *H04W 72/21* (2023.01)
(58) Field of Classification Search
CPC .............. H04W 72/21; H04W 72/569; H04W 72/0446; H04W 72/1268; H04L 1/0027;
(Continued)

(56) References Cited

U.S. PATENT DOCUMENTS

2018/0027576 A1   1/2018  Kowalski et al.
2019/0261391 A1*  8/2019  Kundu ............... H04L 1/0073
(Continued)

FOREIGN PATENT DOCUMENTS

CN   109787728 A   5/2019
CN   109804694 A   5/2019
(Continued)

OTHER PUBLICATIONS

Huawei et al., "Discussion on partial overlay between PUCCHs," 3GPP TSG RAN WG1 Meeting #92bis, Sanya, China, R1-1804427, 9 pages, Apr. 16-20, 2018.
(Continued)

*Primary Examiner* — Nizam U Ahmed
(74) *Attorney, Agent, or Firm* — Perkins Coie LLP

(57) ABSTRACT

Techniques are described to address scenarios involving physical uplink channel conflicts. For example, a method includes performing a combined transmission of a first information multiplexed with a second information on a first physical channel resource selected from the first physical channel resource and a second physical channel resource, where the first physical channel resource and the second physical channel resource have different transmission priorities, where the first physical channel resource is configured to have a last symbol that is earlier in time compared to a last symbol configured for the second physical channel resource, and where the combined transmission is performed in response to the first physical channel resource being configured to include the first information that conflicts within a time period with the second physical channel resource being configured to include the second information.

6 Claims, 16 Drawing Sheets

(58) Field of Classification Search
CPC ... H04L 1/1854; H04L 1/1861; H04L 5/0053; H04L 5/0005; H04L 5/0064
See application file for complete search history.

(56) References Cited

U.S. PATENT DOCUMENTS

| | | |
|---|---|---|
| 2019/0394757 A1 | 12/2019 | Zhang |
| 2021/0007119 A1 | 1/2021 | Li et al. |
| 2021/0068130 A1 | 3/2021 | Liu et al. |
| 2022/0255669 A1* | 8/2022 | Yin .................. H04W 72/21 |

FOREIGN PATENT DOCUMENTS

| | | |
|---|---|---|
| CN | 110149705 A | 8/2019 |
| CN | 110166207 A | 8/2019 |
| CN | 110168996 A | 8/2019 |
| RU | 2653232 C2 | 5/2018 |
| WO | 2019091488 A1 | 5/2019 |

OTHER PUBLICATIONS

Qualcomm Incorporated, "Summary of remaining issues for UCI multiplexing on PUSCH," 3GPP TSG RAN WG1 Meeting #92bis, Sanya, China, R1-1805666, 10 pages, Apr. 16-20, 2018.

International Search Report and Written Opinion for International Application No. PCT/CN2020/074531, mailed on Jul. 1, 2020 (10 pages).

Decision to Grant a Patent for Invention for Russian Patent Application No. 2022121347, mailed Jul. 3, 2023 (12 pages).

Office Action for Russian Patent Application No. 2022121347, mailed Feb. 16, 2023 (13 pages).

Nokia, "On UCI Enhancements for NR URLLC," 3GPP TSG RAN WG1#97, R1-1906752, Reno, Nevada, US, May 13-17, 2019 (14 pages).

Interdigital Inc., "UCI Enhancements for eURLLC," 3GPP TSG RAN WG 1 #97, RI-1907194, Reno, USA, Apr. 13-17, 2019 (6 pages).

Qualcomm Incorporated, "UCI Enhancements for eURLLC," 3GPP TSG-RAN WGI #98, R1-1909265, Prague, Czech Republic, Aug. 26-30, 2019 (22 pages).

Extended European Search Report for European Patent Application No. 20886292.0, mailed Feb. 27, 2023 (11 pages).

Office Action for Chinese Patent Application No. 2020800825648, mailed Jul. 15, 2024 (24 pages).

Li Fangwei et al., "Joint mechanism of channel signature and resource allocation for D2D networks", Journal of Chongqing University of Posts and Telecommunications (Natural Science Edition) dated Aug. 15, 2019 (38 pages).

* cited by examiner

1042 — Performing a transmission of a first information on a first physical channel resource, where the transmission is performed in response to the first physical channel resource having a first transmission priority being configured to include in one time slot of a radio frame a second information that conflicts with each of a plurality of physical channel resources being configured to include a respective information in one time sub-slot of the one time slot of the radio frame

FIG. 10E

Performing a transmission of a first information on a first physical channel resource, where the transmission is performed in response to the first physical channel resource being configured to include a second information that conflicts within a time period with the second physical channel resource being configured to include a third information

MULTIPLE PRIORITY CHANNEL MULTIPLEXING

CROSS REFERENCE TO RELATED APPLICATIONS

This patent document is a continuation of and claims benefit of priority to International Patent Application No. PCT/CN2020/074531, filed on Feb. 7, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for addressing scenarios involving physical uplink channel conflicts.

In a first example embodiment, a wireless communication method comprises performing a combined transmission of a first information multiplexed with a second information on a first physical channel resource selected from the first physical channel resource and a second physical channel resource, where the first physical channel resource and the second physical channel resource have different transmission priorities, where the first physical channel resource is configured to have a last symbol that is earlier in time compared to a last symbol configured for the second physical channel resource, and where the combined transmission is performed in response to the first physical channel resource being configured to include the first information that conflicts within a time period with the second physical channel resource being configured to include the second information.

In some implementations of the first example embodiment, the first information and the second information include a scheduling request (SR), a hybrid automatic repeat request acknowledge (HARQ-ACK), or a channel state information (CSI). In some implementations of the first example embodiment, the first physical channel resource and the second physical channel resource include a first physical uplink control channel (PUCCH) and a second PUCCH. In some implementations of the first example embodiment, the time period comprises one time slot of a radio frame.

In a second example embodiment, a wireless communication method comprises performing a combined transmission of a first information multiplexed with a second information on a first physical channel resource, where the first physical channel resource is configured to have a last symbol at a pre-determined latest time within a time period, where the combined transmission is performed in response to a second physical channel resource being configured to include the first information that conflicts within the time period with a third physical channel resource being configured to include the second information, and where the second physical channel resource and the third physical channel resource have different transmission priorities.

In some implementations of the second example embodiment, the first information and the second information include a scheduling request (SR), a hybrid automatic repeat request acknowledge (HARQ-ACK), or a channel state information (CSI). In some implementations of the second example embodiment, the first physical channel resource, the second physical channel resource, and the third physical channel resource include a first physical uplink control channel (PUCCH), a second PUCCH, and a third PUCCH. In some implementations of the second example embodiment, the time period comprises one time slot of a radio frame.

In a third example embodiment, a wireless communication method comprises performing a combined transmission of multiplexed information on a plurality of physical channel resources, where the multiplexed information includes a first information associated with one physical channel resource multiplexed with a set of information associated with the plurality of physical channel resources, where at least one of the plurality of physical channel resources has a high transmission priority that is higher than a low transmission priority of the one physical channel resource, and where the combined transmission is performed in response to the plurality of physical channel resources being configured to carry the set of information that conflicts within a time period with the one physical channel resource being configured to carry the first information.

In some implementations of the third example embodiment, a physical uplink control channel resource indicator (PRI) of the one physical channel resource is converted from a time slot-level indication to a time sub-slot level indication. In some implementations of the third example embodiment, each of the plurality of physical channel resources are configured to transmit in one time sub-slot of one time slot of a radio frame, and the one physical channel resource is configured to transmit in the one time slot of the radio frame. In some implementations of the third example embodiment, the set of information and the first information include a scheduling request (SR) or a hybrid automatic repeat request acknowledge (HARQ-ACK). In some implementations of the third example embodiment, the plurality of physical channel resources include a plurality of physical uplink control channels (PUCCH), and the one physical channel resource includes one PUCCH. In some implementations of the third example embodiment, the time period comprises one time slot of a radio frame.

In a fourth example embodiment, a wireless communication method comprises performing a combined transmission of an uplink control information (UCI) multiplexed with a first information on a first physical channel resource, where the first physical channel resource has a low transmission priority that is lower than a high transmission priority of a second physical channel resource, and where the combined transmission is performed in response to the first physical channel resource being configured to include the first information that conflicts within a time period with the second physical channel resource being configured to include a second information that includes the UCI.

In some implementations of the fourth example embodiment, within the time period the second physical channel resource overlaps with at least some of the first physical channel resource to form an overlapping region within the time period. In some implementations of the fourth example embodiment, the UCI is included in the combined transmission is located within the overlapping region. In some implementations of the fourth example embodiment, the first physical channel includes a first number of available time-frequency resources within the overlapping region that is less than a second number of time-frequency resources needed for the UCI in the combined transmission, and a last symbol of a resource element (RE) occupied by the UCI in the combined transmission is not later in time than a last symbol of the second information to be carried by the second physical channel resource.

In some implementations of the fourth example embodiment, prior to performing the combined transmission, the method includes determining that the first physical channel includes a first number of available time-frequency resources that is greater than or equal to a second number of time-frequency resources needed for the UCI. In some implementations of the fourth example embodiment, the first physical channel resource include a physical uplink shared channel (PUSCH) and the second physical channel resource includes a physical uplink control channel (PUCCH). In some implementations of the fourth example embodiment, the time period comprises one time slot of a radio frame.

In a fifth example embodiment, a wireless communication method comprises performing a transmission of a first information on a first physical channel resource, where the transmission is performed in response to the first physical channel resource having a first transmission priority being configured to include in one time slot of a radio frame a second information that conflicts with each of a plurality of physical channel resources being configured to include a respective information in one time sub-slot of the one time slot of the radio frame, where at least one of the plurality of physical channel resources has a second transmission priority, and where in at least one time sub-slot a portion of the first information includes any one of: a portion of the second information corresponding to the at least one time sub-slot according to a first rule, a third information of the at least one of the plurality of physical channel resources corresponding to the at least one time sub-slot according to a second rule, and the portion of the second information multiplexed with the third information according to a third rule.

In some implementations of the fifth example embodiment, the first rule specifies that in the at least one time sub-slot the portion of the first information includes the portion of the second information corresponding to the at least one time sub-slot in response to: the first physical channel including a first number of available time-frequency resources within the at least one time sub-slot that is less than a second number of time-frequency resources needed for the third information of the at least one of the plurality of physical channel resources, and the first transmission priority of the first physical channel resource is higher than the second transmission priority of the at least one of the plurality of physical channel resources.

In some implementations of the fifth example embodiment, the second rule specifies that in the at least one time sub-slot the portion of the first information includes the third information of the at least one of the plurality of physical channel resources corresponding to the at least one time sub-slot in response to: the first physical channel including a first number of available time-frequency resources within the at least one time sub-slot that is less than a second number of time-frequency resources needed for the third information of the one of the plurality of physical channel resources, and the first transmission priority of the first physical channel resource is either lower than or is same as the second transmission priority of the at least one of the plurality of physical channel resources.

In some implementations of the fifth example embodiment, the third rule specifies that in the at least one time sub-slot the portion of the second information is multiplexed with the third information of the at least one of the plurality of physical channel resources in response to: the first physical channel including a first number of available time-frequency resources within the at least one time sub-slot that is greater than or equal to a second number of time-frequency resources needed for the third information. In some implementations of the fifth example embodiment, the respective information and the third information includes a hybrid automatic repeat request acknowledge (HARQ-ACK). In some implementations of the fifth example embodiment, the first physical channel resource includes a physical uplink shared channel (PUSCH) and the plurality of physical channel resources include a plurality of physical uplink control channels (PUCCHs).

In a sixth example embodiment, a wireless communication method comprises performing a transmission of a first information on a first physical channel resource, where the first physical channel resource has a higher transmission priority than that of a second physical channel resource, and where the transmission is performed in response to the first physical channel resource being configured to include a second information that conflicts within a time period with the second physical channel resource being configured to include a third information.

In some implementations of the sixth example embodiment, the first information includes either only the second information or the second information multiplexed with a channel occupancy time (COT) shared information included in the third information. In some implementations of the sixth example embodiment, the first information includes only the second information in response to a multiplexing option being unsupported or not configured. In some implementations of the sixth example embodiment, the first information includes the second information multiplexed with the COT shared information in response to a channel access priority type (CAPC) value included in the COT being lower than a pre-determined threshold value. In some implementations of the sixth example embodiment, the first physical channel resource includes a physical uplink control channel (PUCCH) and the second physical channel resource include a physical uplink shared channel (PUSCH).

In some implementations of the sixth example embodiment, the first information includes either only the second information or a component carrier group uplink control information (CG-UCI) included in the second information multiplexed with a hybrid automatic repeat request acknowledge (HARQ-ACK) included in the third information. In some implementations of the sixth example embodiment, the first information includes only the second information in response to a multiplexing option being unsupported or not configured. In some implementations of the sixth example embodiment, the first physical channel resource includes a physical uplink shared channel (PUSCH) and the second physical channel resource include a physical uplink control channel (PUCCH). In some implementations of the sixth example embodiment, the transmission is performed in an unlicensed spectrum.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 10A to 10F show six example flowcharts to address physical uplink channel conflicts.

DETAILED DESCRIPTION

Figure 1:
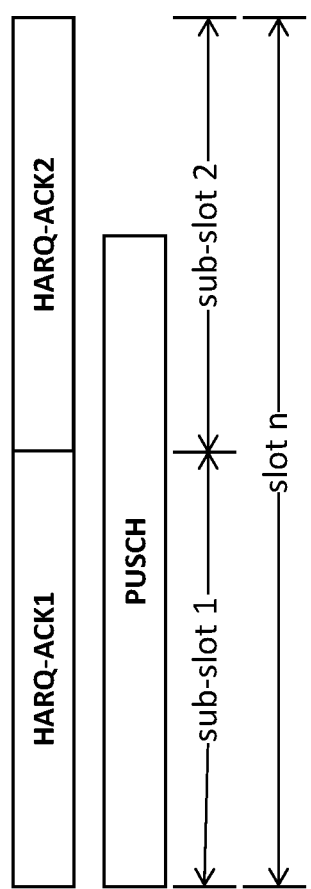
FIG. 1 shows a conflict between a physical uplink shared channel (PUSCH) and multiple physical uplink control channels (PUCCHs) in a time slot.

This patent document describes several example techniques for resolving a physical uplink channel conflict. First, an overview of the technical problem is provided followed by the example techniques to resolve uplink channel conflicts. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Overview

During the transmission of uplink information, uplink channel resources occupied by control information and data information may cause conflicts in the time domain. If the conflicting uplink channels have the same priority, for different information carried on the conflicting channels, the base station and the user equipment (UE) will multiplex the information carried by these conflicting channels through some agreed rule, and then use existing or new uplink resources to transmit the multiplexed information.

In Release-17 (R17) of 3GPP standard, the information carried by the uplink channel may be high-priority or low-priority. For example, a channel carrying ultra-reliable low-latency communication (URLLC) services is generally regarded as a high priority channel, and a channel carrying enhanced mobile broadband (eMBB) services is generally regarded as a low priority channel. However, channel resources of different priorities configured by the base station may also overlap in the time domain so that conflicts between channels of different service types need to be considered.

In conventional technology, a method for dealing with conflicts between different priority channels is to drop the low priority channels and only transmit the high priority channels. Such a technique seriously impairs the performance of the eMBB service. The proposed technology described in this patent document addresses at least these conflict scenarios so that information of all service types can be transmitted as much as possible. The proposed technology can also enable the delay and reliability of high-priority services to not be affected after multiplexing. Release-16 (R16) of 3GPP standard resolved the time domain conflict of the uplink physical channel by specifying priorities of URLLC and eMBB services. For conflicts between uplink channels of the same priority, the processing method is to re-use the rule of Release-15 (R15) of the 3GPP standard, in which for conflicts between uplink channels of different priorities, the processing method is to drop the low-priority channels and only transmit the high-priority channels. This conflict resolution mechanism can guarantee the quality of high-priority services, but it has a large adverse effect on low-priority services. For example, a PUCCH resource carrying a URLLC Hybrid Automatic Repeat Request Acknowledge (HARQ-ACK) and a Physical Uplink Control Channel (PUCCH) resource carrying an eMBB Scheduling Request (SR) overlap in the time domain position. The solution of the existing solution is to transmit only the HARQ-ACK of URLLC and drop the eMBB SR. Obviously, this method will seriously affect the quality of eMBB services. Thus, a new multiplexing scheme needs to be proposed to resolve conflicts between different priority channels.

In addition, in order to reduce the delay of the URLLC service, the concept of sub-slot is introduced in R16. There can be multiple non-conflicting PUCCH resources carrying HARQ-ACK in a slot. If the time domain resources allocated by the base station for the Physical Uplink Shared Channel (PUSCH) are long, there may be a case, as shown in FIG. 1, where multiple HARQ-ACKs in a slot conflict with the PUSCH. The techniques described in this patent document also proposes a multiplexing method for such conflict scenarios.

II. Technical Solutions

II.(a). Example 1

Figure 2:
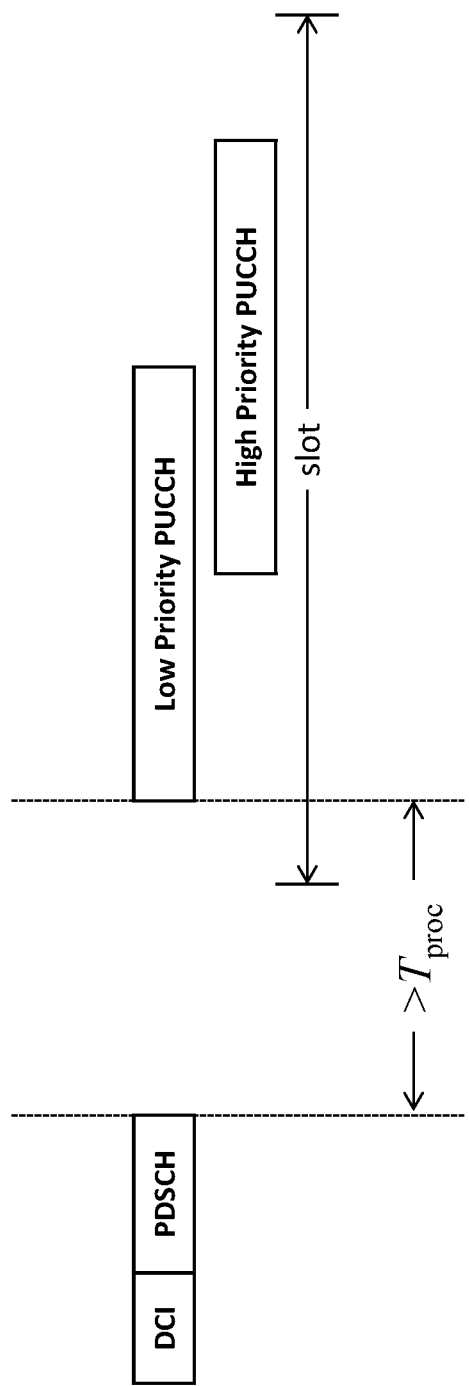
FIG. 2 shows a conflict between two PUCCHs having different transmission priorities where one of the two PUCCHs is used for a combined transmission.

Referring to FIG. 2, if two PUCCH resources of different priorities conflict in time domain and meet the timeline (e.g., if the conflict is within a time slot), then the information carried on the two PUCCHs is multiplexed. Then, one of the two PUCCH resources of different priorities is selected to retransmit the multiplexed information, or a new PUCCH resource is used to transmit the multiplexed information.

If one of the two PUCCH resources is selected for transmitting the multiplexed information, in order to reduce the delay of the high-priority PUCCH, the PUCCH resource with the earliest last symbol of these two PUCCH resources may be selected for transmitting the multiplexed information. For example, in FIG. 2, a low-priority PUCCH resource is selected.

Figure 3:
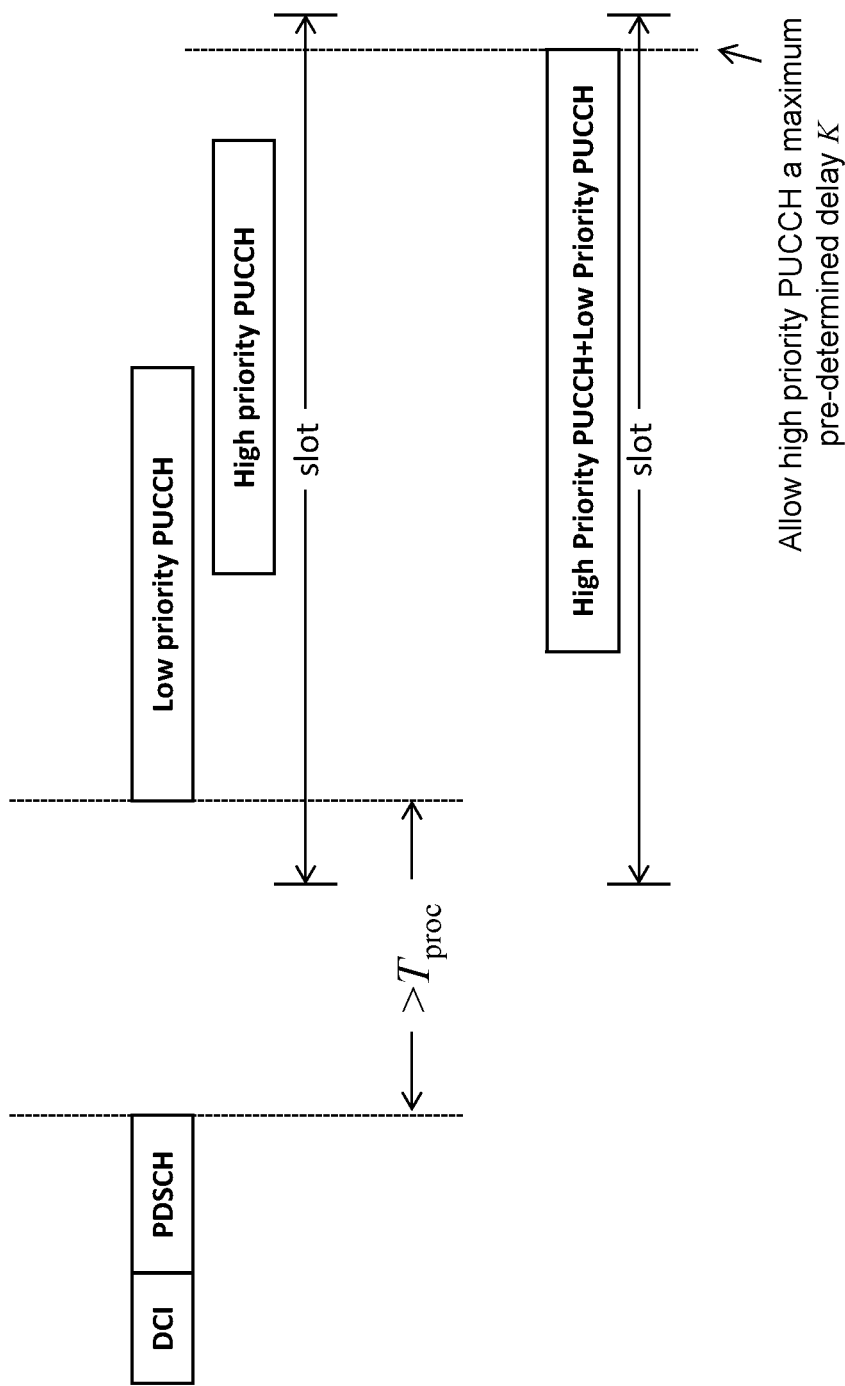
FIG. 3 shows a conflict between two PUCCHs having different transmission priorities and a third PUCCH is used for a combined transmission.

If a new PUCCH resource is used to transmit multiplexed information, the new PUCCH resource can allow a certain delay within a time slot compared to the high-priority PUCCH resource before multiplexing within the same time slot. This delay can be limited by setting the latest time K at which the last symbol of the PUCCH resource appears within a slot after multiplexing to allow the delay in reporting the priority PUCCH to not be affected, as shown in FIG. 3.

The low-priority PUCCH can carry SR, HARQ-ACK or channel state information (CSI), and the high-priority PUCCH can carry SR or HARQ-ACK.

Several technical benefits can be achieved by the techniques described in Example 1. For example, the conflict channel solution proposed in the embodiments in Example 1 can make the multiplexed information always transmitted on the PUCCH resource required by the symbol delay when the high and low priority channels conflict, thereby ensuring that the delay of high priority services is not affected In Example 1, for PUCCH resources with different priority conflicts, when the timeline is satisfied, the PUCCH resource with the earliest last symbol can be selected to transmit the multiplexed information, or the new PUCCH resource can be used to transmit the multiplexed information. The new PUCCH resource is compared with the pre-multiplexed resource. The high-priority PUCCH resource can allow a certain delay.

II.(b). Example 2

Figure 4:
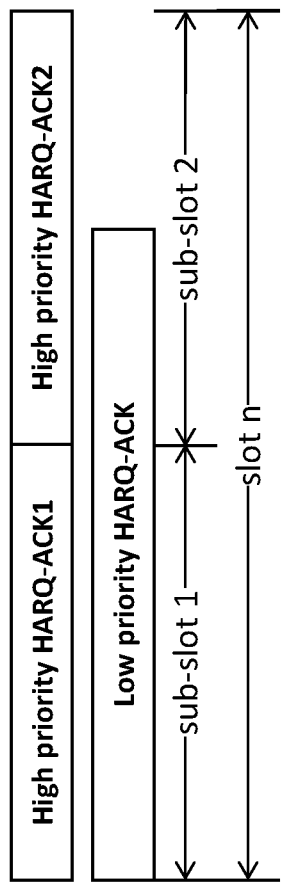
FIG. 4 shows a conflict between two PUCCHs having high transmission priorities and occupying sub-slots and a PUCCH having a low transmission priority and occupying a slot, where the two PUCCHs are associated with a downlink control information (DCI) received in time before the DCI associated with the PUCCH with the low transmission priority.
Figure 4:
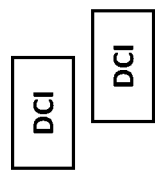

When at least one of multiple PUCCH resources carrying a high priority HARQ-ACK conflicts with one PUCCH resource carrying a low priority HARQ-ACK, an existing method is to use the PUCCH Resource Indicator (PRI) in last DCI to find a new resource to transmit the multiplexed information. If the last DCI is a scheduled HARQ-ACK with a low priority, as shown in FIG. 4, according to the existing or conventional method, a slot based PUCCH resource is selected by using the PRI in the low priority DCI to transmit the multiplexed information. In this example, the reliability of high-priority HARQ-ACK may not be guaranteed.

Since the sub-slot based PUCCH resources are used to transmit high-priority HARQ-ACK, it has high reliability. To enable the performance of high-priority HARQ-ACK after multiplexing, the low-priority last DCI PRI (slot based) is treated as high-priority PRI (sub-slot based). In this way, the selected PUCCH resources are high-priority resources, which can enable the reliability of high-priority HARQ-ACK.

Figure 5:
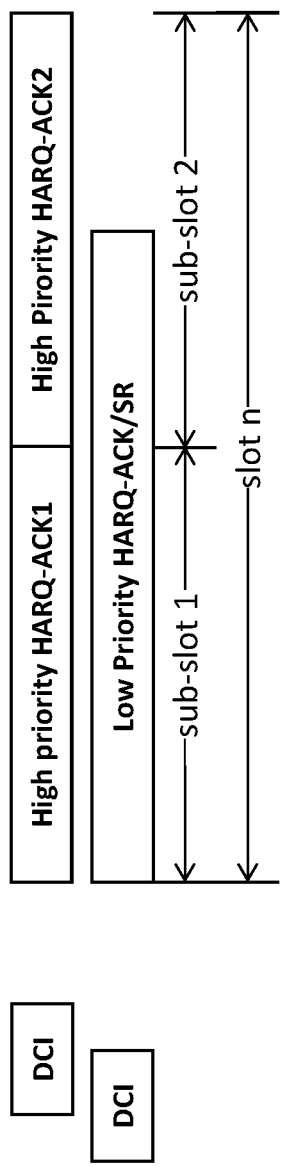
FIG. 5 shows a conflict between two PUCCHs having high transmission priorities and occupying sub-slots and a PUCCH having a low transmission priority and occupying a slot, where the two PUCCHs are associated with a downlink control information (DCI) received in time after the DCI associated with the PUCCH with the low transmission priority.

Conversely, the indication that the PRI has a sub-slot level can also be converted into a slot-level indication. As shown in FIG. 5, if the last DCI schedules a high-priority HARQ-ACK, it conflicts with the PUCCH resource carrying the low-priority HARQ-ACK or SR. Thus, in an example scenario where each of multiple PUCCHs occupy a sub-slot, at least one PUCCH of the multiple PUCCHs can include a high-priority HARQ-ACK that can conflict with another PUCCH occupying at least some portion of a slot with a low-priority HARQ-ACK or SR. After all the conflicting information is multiplexed, the PRI of the last DCI is regarded as the slot level which indicates that the selected PUCCH resource is a resource based on slot configuration, and the number of time domain symbols is large.

There are several technical advantages of the embodiments of Example 2. For example, when multiple high-priority HARQ-ACKs and low-priority HARQ-ACKs conflict, the multiplexing scheme transmits the multiplexed information on a high-priority PUCCH resource, which can enable the high reliability of priority services to not be affected.

In Example 2, when multiple PUCCH resources with high priority HARQ-ACK conflict with PUCCH resources carrying low priority HARQ-ACK, the PRI can be converted from a slot-level indication to a sub-slot-level indication, or from a slot-level instruction to sub-slot level instruction.

II.(c). Example 3

Figure 6A:
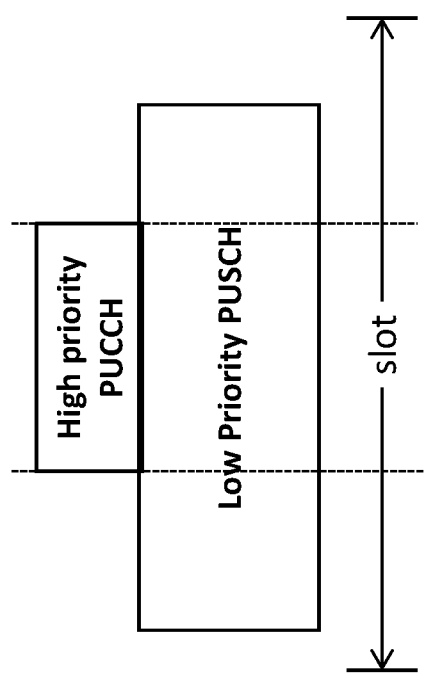
FIG. 6A shows a conflict between a high transmission priority PUCCH including an uplink control information (UCI) and a low transmission priority PUSCH.
Figure 6B:
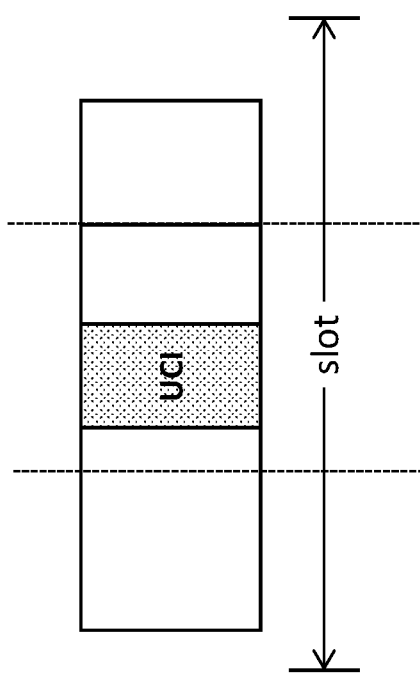
FIG. 6B shows a low transmission priority PUSCH including the UCI within an overlapping region where the PUCCH overlaps with the PUSCH.

As shown in FIG. 6A, when a high-priority PUCCH and a low-priority PUSCH conflict, if the PUSCH has sufficient resources at the position overlapping the PUCCH time domain to multiplex the uplink control information (UCI) carried on the high-priority PUCCH, then at these overlapping positions, the high-priority UCI is mapped to the resources of the PUSCH according to the existing rules, as shown in FIG. 6B.

Figure 7A:
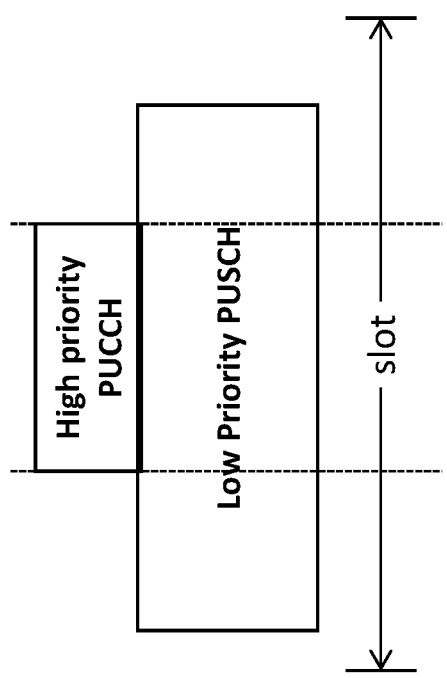
FIG. 7A shows another conflict between a high transmission priority PUCCH including an uplink control information (UCI) and a low transmission priority PUSCH.
Figure 7B:
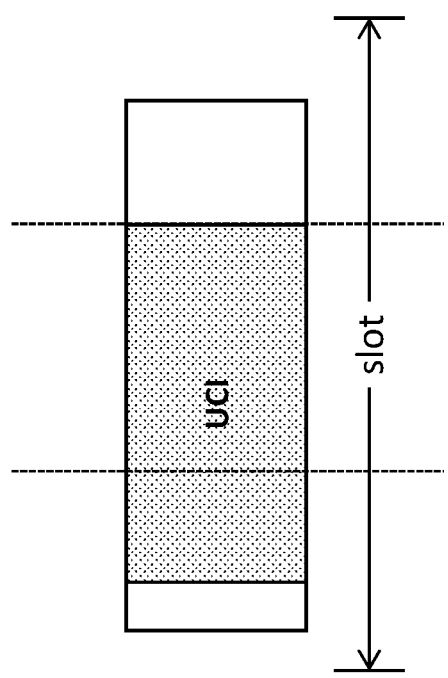
FIG. 7B shows a low transmission priority PUSCH including the UCI that extends past the overlapping region where the PUCCH overlaps with the PUSCH.
Figure 8A:
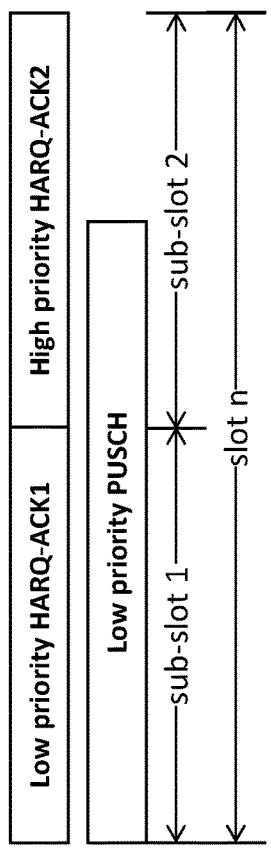
FIGS. 8A to 8F show six scenarios where two PUCCHs in two sub-slots conflict with a PUSCH, where at least one PUCCH has a different transmission priority than the PUSCH.
Figure 8B:
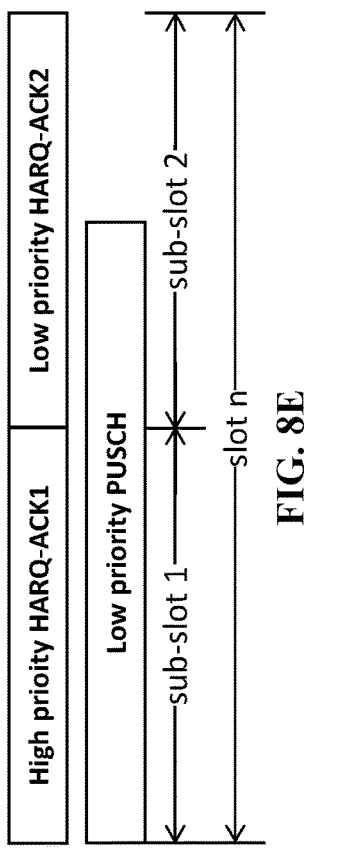
Figure 8C:
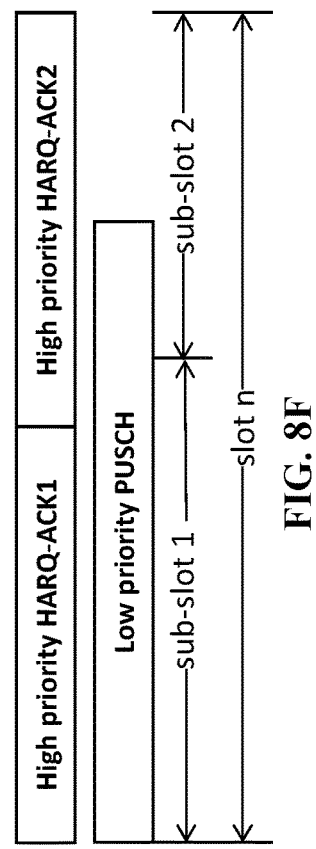
Figure 8D:
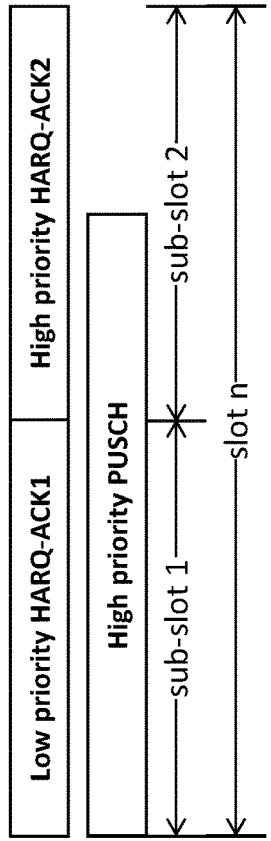
Figure 8E:
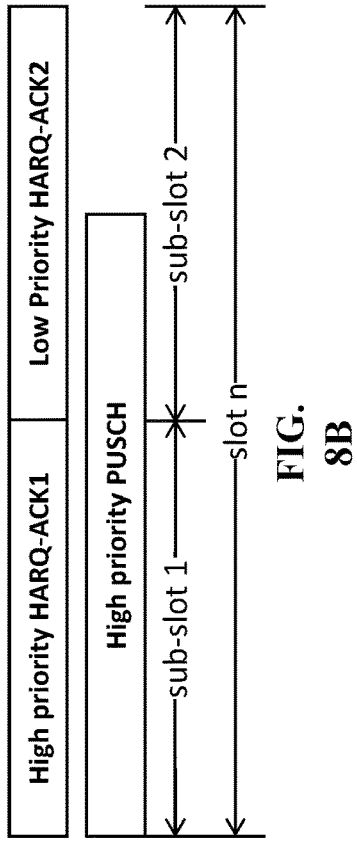
Figure 8F:
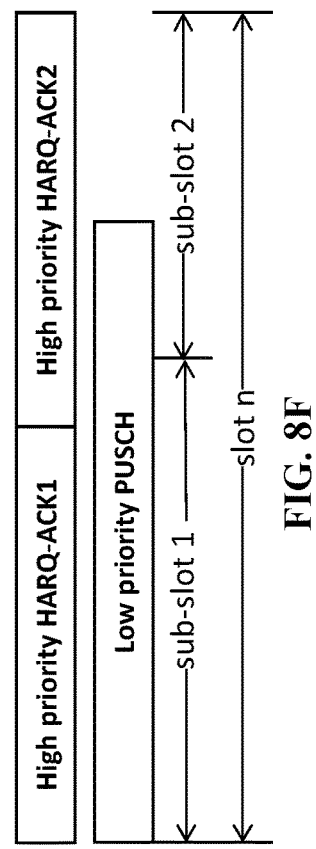
Figure 9A:
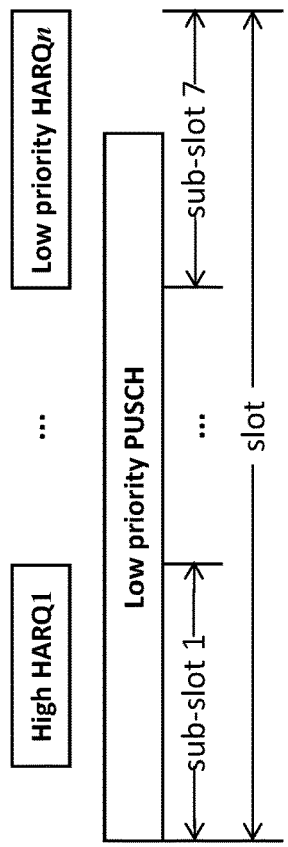
FIGS. 9A to 9D show four scenarios where at least two PUCCHs in multiple sub-slots conflict with a PUSCH, where at least one PUCCH has a different transmission priority than the PUSCH.
Figure 9A:
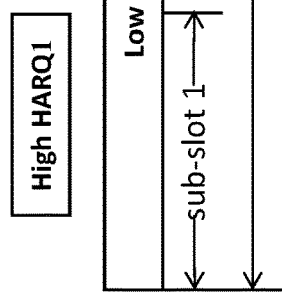
Figure 9C:
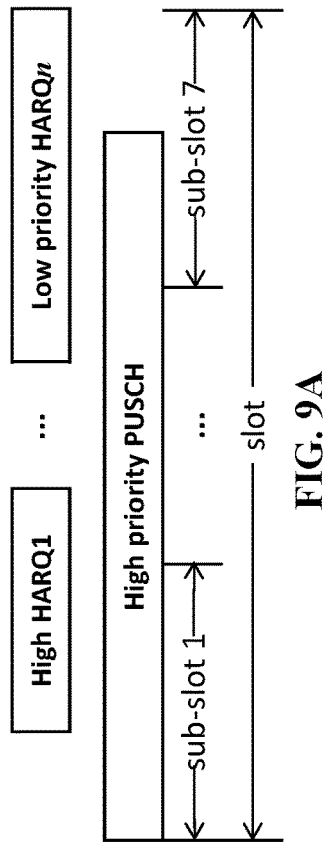
Figure 9B:
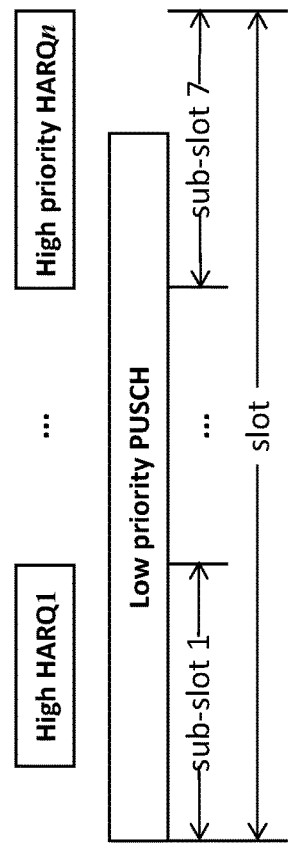
Figure 9D:
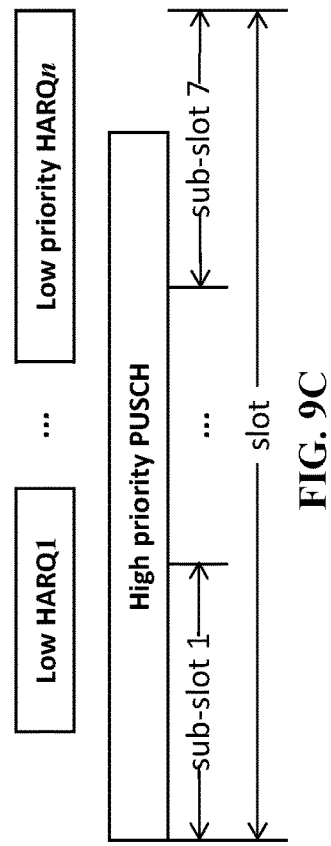

In the conflict scenario of FIG. 6A, in order to avoid the high number of information bits carried by the high-priority PUCCH, the number of resources on the PUSCH overlapping the PUCCH is too small to map the information bits carried by the PUCCH. In the case of the multiplexing scheme, when the timeline is met, the UCI carried by the high-priority PUCCH is mapped from the first symbol after the DMRS according to the conventional methods. However, the last symbol of the resource element (RE) occupied by the UCI may not be later in time than the last symbol of the high-priority PUCCH, as shown in FIG. 7B.

Alternatively, when the conflict scenario in FIG. 6A occurs, the UE first determines whether the time-frequency resources of the PUSCH overlapping with the PUCCH or the time-frequency resources on the PUSCH before the last symbol of the PUCCH are sufficient to map the bearers carried on the high-priority PUCCH UCI information bits. If the resources are sufficient, the UCI information bits carried by the PUCCH are multiplexed in the manner shown in FIG. 6B or FIG. 7B, otherwise no multiplexing is performed.

There are several technical advantages of the embodiments described for Example 3. For example, the conflict resolution between the high-priority PUCCH and the low-priority PUSCH proposed in Example 3 multiplexes the high-priority UCI to the low-priority PUSCH, and specifies the position of the high-priority UCI after multiplexing, which can enable the multiplexing delays with high-priority services to not be affected.

In some embodiments in Example 3, the conflict between the high-priority PUCCH and the low-priority PUSCH can be resolved by multiplexing UCI carried on the PUCCH with the information carried by PUSCH resources that overlap with the PUCCH in time domain. In some embodiments in Example 3, if there is a conflict between the high-priority PUCCH and the low-priority PUSCH, UCI information carried by the PUCCH can be multiplexed on the PUSCH resource at a time before the last symbol of the PUCCH. In some embodiments in Example 3, when the PUCCH and the PUSCH overlap and thus conflict, the process may include first determining whether the PUSCH resources at the time before the last symbol of the PUSCH are sufficient to multiplex the UCI information carried by the PUCCH.

II.(d). Example 4

In the case that a PUCCH resource carrying HARQ-ACK on multiple sub-slots in a slot conflicts with a PUSCH, the conflict between the PUCCH carrying HARQ-ACK in each sub-slot and PUSCH are treated as slot-level conflicts. The priority of PUSCH in each sub-slot is the same. In this way, this conflict scenario is converted into a conflict in the slot, and the conflict between the PUSCH and the PUCCH carrying the HARQ-ACK in one slot can be resolved according to conventional techniques.

For example, if a slot is divided into two sub-slots, the priority of HARQ-ACK carried by the PUCCH resources in the two sub-slots may be the same or different. The PUSCH that conflicts with the two PUCCHs at the same time may be high priority or low priority, as shown in FIGS. 8A-8F.

HARQ-ACKs are mapped to PUSCHs in the respective sub-slots in sub-slot 1 and sub-slot 2. If there are too few PUSCH resources in a sub-slot, the HARQ-ACK in a sub-slot may not be mapped to the PUSCH's RE in a slot. When the PUSCH and HARQ-ACK priorities in a sub-slot are different, the low priority channel in the sub-slot is dropped, and only the high-priority channel is transmitted. When the PUSCH in a sub-slot has the same priority as the HARQ-ACK, only the HARQ-ACK in this sub-slot is transmitted. For example, in the conflict scenario of FIG. 8F, if the PUSCH resources in sub-slot 1 are sufficient to map HARQ-ACK1, the number of PUSCH resources in sub-slot 2 is not enough to map HARQ-ACK2. Due to the priority of the PUSCH, the part of the low-priority PUSCH in sub-slot 2 is dropped, and the PUSCH and HARQ-ACK1 multiplexed information is transmitted in sub-slot1 and only HARQ-ACK2 is transmitted in sub-slot 2.

Similarly, if a slot is divided into 7 sub-slots, the PUCCH in each sub-slot can carry HARQ-ACKs with the same priority and HARQ-ACKs with different priorities. A PUSCH that conflicts with multiple HARQ-ACKs at the same time may be a high priority or a low priority, as shown in FIGS. 9A-9D. In this case, conflicts in the sub-slot can also be treated as conflicts in the slot, that is, HARQ-ACK is mapped to the resources of the PUSCH. If the resources on a PUSCH are not enough to map HARQ-ACK, only the HARQ-ACK in the sub-slot is transmitted at the same priority, and only the high-priority channels in the sub-slot are transmitted at different priorities. Thus, only the HARQ-ACK is transmitted when two channels have the same priority, otherwise the low priority channel is dropped and the high-priority channel is transmitted in the sub-slot. In some embodiments, techniques can be employed to treat slot-level conflicts as sub-slot-level conflicts.

There are several technical advantages of the embodiments described for Example 4. For example, the multiplexing scheme proposed in Example 4 can enable the delay of high-priority services to not be affected and can have less impact on low-priority services.

In Example 4, the conflict between HARQ-ACK and PUSCH in each sub-slot can be treated as a slot-level conflict. The priority of PUSCH in each sub-slot can be the same. Thus, the techniques described in Example 4 can translate this conflict scenario into a conflict within the slot.

II.(e). Example 5

When URLLC works in unlicensed spectrum (NR-U), because NR-U does not consider the high and low priority of PUSCH and PUCCH, it is possible to drop the channel with high priority when performing multiplexing or dropping which affects the performance of URLLC. To improve the reliability of URLLC transmission, some example multiplexing or dropping scenarios are described below.

Scenario 1 [Existing NR-U technology]: When PUSCH and PUCCH are both low priority or high priority, the processing mechanism is the same as that of R16 NR-U. Specifically, when the PUSCH and the PUCCH (bearing component carrier group-UCI (CG-UCI)) overlap, a multiplexing mode or a dropping mode for PUSCH can be configured. When configured for multiplexing, CG-UCI and HARQ-ACK are jointly encoded, and CG-UCI can be regarded as the same type of HARQ-ACK. When dropping is configured (that is, no multiplexing is configured), when the PUCCH and the PUSCH overlap, the PUSCH is dropped. CG-UCI is the HARQ ID, RV, NDI, and COT (channel occupation time) shared information corresponding to the currently transmitted CG PUSCH. The COT shared information includes the shared duration, offset value, and CAPC (channel access priority type).

Scenario 2: When PUCCH is high priority and PUSCH is low priority. In order to improve the reliability of URLLC transmission, the multiplexing or dropping method is one of the following methods: Method 1. When (bearing CG-UCI) PUSCH and PUCCH overlap, two ways of multiplexing or dropping PUSCH can be configured. When multiplexing is not configured, Then, when the PUCCH and the PUSCH overlap, the PUSCH is dropped (same as the existing NR-U technology); Method 2. The PUSCH is dropped. Specifically, when the multiplexing method is not supported, when the PUCCH and the PUSCH overlap, the PUSCH is dropped. Thus, in Scenario 2, the difference between Method 2 and Method 1 is that the former can directly drop the PUSCH, while the latter requires RRC configuration to perform the multiplexing or dropping operations. If multiplexing is not configured, the PUSCH can be discarded; Method 3. Drop the PUSCH and multiplex the COT shared information to the PUCCH. Specifically, when the CG-UCI is carried on the PUSCH and the CG-UCI contains the COT shared information, the PUSCH is dropped and the COT shared information is multiplexed to the PUCCH. Optionally, the PUSCH is jointly encoded with HARQ-ACK and carried on the PUCCH; or, Determine whether to multiplex to PUCCH according to the content of the COT shared information, optionally, determine whether to multiplex to PUCCH according to whether the value of CAPC is lower than the threshold value X, for example, X=2, then for CAPC=1, share the COT Information is multiplexed to PUCCH. For CAPC=2/3/4, there is no need to multiplex COT shared information to PUCCH.

Scenario 3: When PUCCH is low priority and PUSCH is high priority. In order to improve the reliability of URLLC transmission, the multiplexing or dropping method is one of the following methods: Method 1. When (bearing CG-UCI) PUSCH and PUCCH overlap, two ways of multiplexing or dropping PUSCH can be configured. When multiplexing is not configured, The PUSCH is dropped when the PUCCH overlaps with the PUSCH (same as the existing NR-U technology); Method 2. Drop the PUCCH. Specifically, when the multiplexing mode is not supported, when the PUCCH overlaps with the PUSCH, the PUCCH is dropped; Method 3. Drop the PUCCH and multiplex the HARQ-ACK information to the PUSCH. Specifically, when the UCI carried on the PUCCH contains HARQ-ACK information, the PUCCH is dropped and the HARQ-ACK information is multiplexed to the PUSCH. Optionally, when the CG-UCI is carried on the PUSCH, the HARQ-ACK information is combined with the CG-UCI joint coding.

There are several technical benefits of the embodiments described in Example 5. For example, through a channel collision resolution method described in Example 5, in an unlicensed spectrum, by judging the priority of a collision channel, a dropped or multiplexed channel can be determined, and when a service channel is dropped, multiplexing may be allowed The channel sharing information better considers the functions of high-priority channels and ensuring that the downlink channel shares the uplink channel COT function, ensuring URLLC performance and improving the efficiency of unlicensed spectrum use.

In Example 5, when URLLC operates on an unlicensed carrier, the multiplexing or dropping mechanism when the uplink channels of the same UE overlap can be as follows: (1) When PUCCH is high priority and PUSCH is low priority, PUSCH may be dropped, or PUSCH may be dropped and multiplex the COT shared information configured to be included in the PUSCH with the information to be carried in the PUCCH; (2) when the PUCCH is of low priority and the PUSCH is of high priority, the PUCCH may be dropped, or the PUCCH may be dropped and the HARQ-ACK information in the PUCCH is jointly encoded or multiplexed with the CG-UCI configured to be included in PUSCH and the jointly encoded information can be carried on the PUSCH.

Figure 10A:
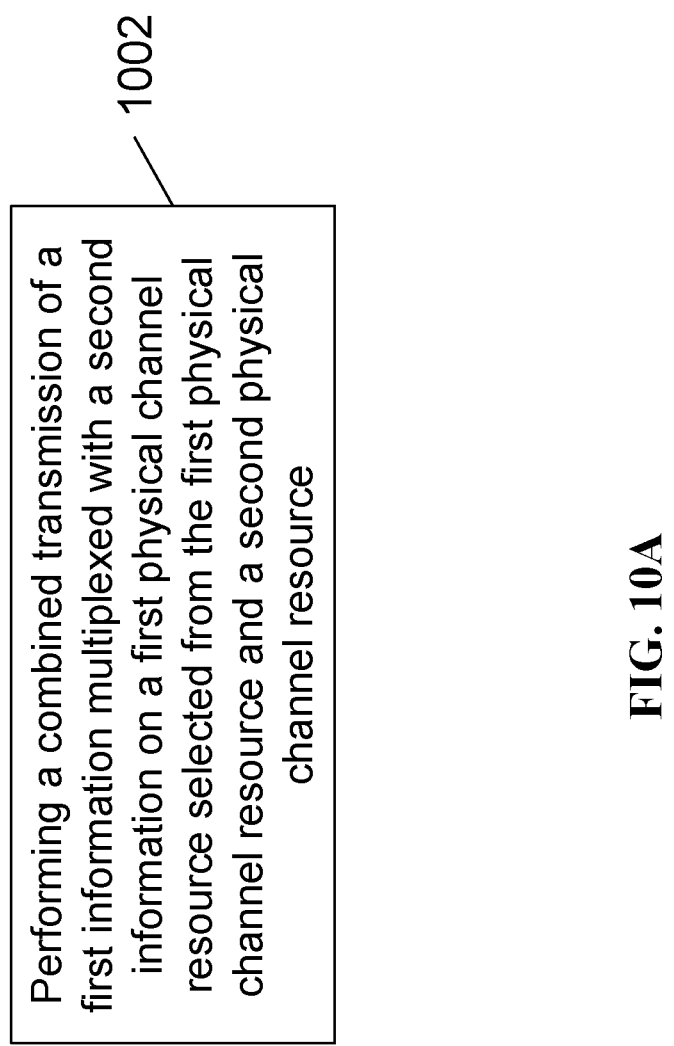

FIG. 10A shows a first exemplary flowchart for performing a combined transmission. Operation 302 includes performing a combined transmission of a first information multiplexed with a second information on a first physical channel resource selected from the first physical channel resource and a second physical channel resource, where the first physical channel resource and the second physical channel resource have different transmission priorities, where the first physical channel resource is configured to have a last symbol that is earlier in time compared to a last symbol configured for the second physical channel resource, and where the combined transmission is performed in response to the first physical channel resource being configured to include the first information that conflicts within a time period with the second physical channel resource being configured to include the second information. In some embodiments, the combined transmission of operation 1002 is performed upon determining that the first physical channel resource is configured to include the first information that conflicts within a time period with the second physical channel resource being configured to include the second information.

In some embodiments of the method of FIG. 10A, the first information and the second information include a scheduling request (SR), a hybrid automatic repeat request acknowledge (HARQ-ACK), or a channel state information (CSI). In some embodiments of the method of FIG. 10A, the first physical channel resource and the second physical channel resource include a first physical uplink control channel (PUCCH) and a second PUCCH. In some embodiments of the method of FIG. 10A, the time period comprises one time slot of a radio frame.

Figure 10B:
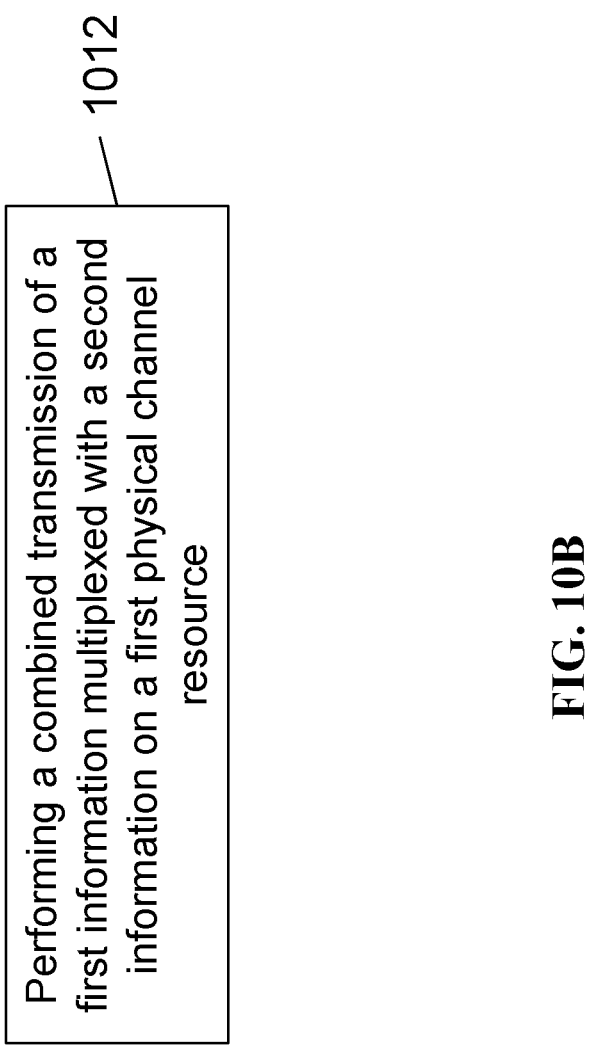

FIG. 10B shows a second exemplary flowchart for performing a combined transmission. Operation 1012 includes performing a combined transmission of a first information multiplexed with a second information on a first physical channel resource, where the first physical channel resource is configured to have a last symbol at a pre-determined latest time within a time period, where the combined transmission is performed in response to a second physical channel resource being configured to include the first information that conflicts within the time period with a third physical channel resource being configured to include the second information, and where the second physical channel resource and the third physical channel resource have different transmission priorities. In some embodiments, the combined transmission of operation 1012 is performed upon determining that the second physical channel resource is configured to include the first information that conflicts within the time period with a third physical channel resource being configured to include the second information.

In some embodiments of the method of FIG. 10B, the first information and the second information include a scheduling request (SR), a hybrid automatic repeat request acknowledge (HARQ-ACK), or a channel state information (CSI). In some embodiments of the method of FIG. 10B, the first physical channel resource, the second physical channel resource, and the third physical channel resource include a first physical uplink control channel (PUCCH), a second PUCCH, and a third PUCCH. In some embodiments of the method of FIG. 10B, the time period comprises one time slot of a radio frame.

Figure 10C:
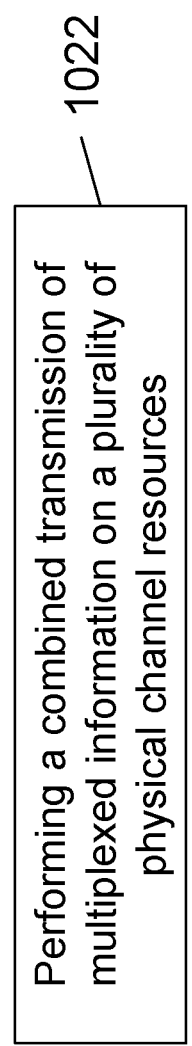

FIG. 10C shows a third exemplary flowchart for performing a combined transmission. Operation 1022 includes performing a combined transmission of multiplexed information on a plurality of physical channel resources, where the multiplexed information includes a first information associated with one physical channel resource multiplexed with a set of information associated with the plurality of physical channel resources, where at least one of the plurality of physical channel resources has a high transmission priority that is higher than a low transmission priority of the one physical channel resource, and where the combined transmission is performed in response to the plurality of physical channel resources being configured to carry the set of information that conflicts within a time period with the one physical channel resource being configured to carry the first information. In some embodiments, the combined transmission of operation 1022 is performed upon determining that the plurality of physical channel resources is configured to carry the set of information that conflicts within a time period with the one physical channel resource being configured to carry the first information.

In some embodiments of the method of FIG. 10C, a physical uplink control channel resource indicator (PRI) of the one physical channel resource is converted from a time slot-level indication to a time sub-slot level indication. In some embodiments of the method of FIG. 10C, each of the plurality of physical channel resources are configured to transmit in one time sub-slot of one time slot of a radio frame, and the one physical channel resource is configured to transmit in the one time slot of the radio frame. In some embodiments of the method of FIG. 10C, the set of information and the first information include a scheduling request (SR) or a hybrid automatic repeat request acknowledge (HARQ-ACK). In some embodiments of the method of FIG. 10C, the plurality of physical channel resources include a plurality of physical uplink control channels (PUCCH), and the one physical channel resource includes one PUCCH. In some embodiments of the method of FIG. 10C, the time period comprises one time slot of a radio frame.

Figure 10D:
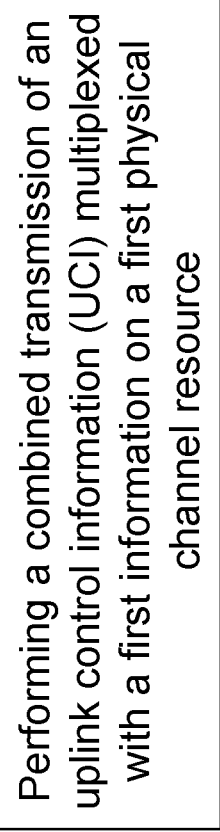

FIG. 10D shows a fourth exemplary flowchart for performing a combined transmission. Operation 1032 includes performing a combined transmission of an uplink control information (UCI) multiplexed with a first information on a first physical channel resource, where the first physical channel resource has a low transmission priority that is lower than a high transmission priority of a second physical channel resource, and where the combined transmission is performed in response to the first physical channel resource being configured to include the first information that conflicts within a time period with the second physical channel resource being configured to include a second information that includes the UCI. In some embodiments, the combined transmission of operation 1032 is performed upon determining that the first physical channel resource is being configured to include the first information that conflicts within a time period with the second physical channel resource being configured to include a second information that includes the UCI.

In some embodiments of the method of FIG. 10D, within the time period the second physical channel resource overlaps with at least some of the first physical channel resource to form an overlapping region within the time period. In some embodiments of the method of FIG. 10D, the UCI is included in the combined transmission is located within the overlapping region. In some embodiments of the method of FIG. 10D, the first physical channel includes a first number of available time-frequency resources within the overlapping region that is less than a second number of time-frequency resources needed for the UCI in the combined transmission, and a last symbol of a resource element (RE) occupied by the UCI in the combined transmission is not later in time than a last symbol of the second information to be carried by the second physical channel resource.

In some embodiments of the method of FIG. 10D, prior to performing the combined transmission, the method includes determining that the first physical channel includes a first number of available time-frequency resources that is greater than or equal to a second number of time-frequency resources needed for the UCI. In some embodiments of the method of FIG. 10D, the first physical channel resource include a physical uplink shared channel (PUSCH) and the second physical channel resource includes a physical uplink control channel (PUCCH). In some embodiments of the method of FIG. 10D, the time period comprises one time slot of a radio frame.

FIG. 10E shows a fifth exemplary flowchart for performing a transmission on a physical channel resource. Operation 1042 includes performing a transmission of a first information on a first physical channel resource, where the transmission is performed in response to the first physical channel resource having a first transmission priority being configured to include in one time slot of a radio frame a second information that conflicts with each of a plurality of physical channel resources being configured to include a respective information in one time sub-slot of the one time slot of the radio frame, where at least one of the plurality of physical channel resources has a second transmission priority, and where in at least one time sub-slot a portion of the first information includes any one of: a portion of the second information corresponding to the at least one time sub-slot according to a first rule, a third information of the at least one of the plurality of physical channel resources corresponding to the at least one time sub-slot according to a second rule, and the portion of the second information multiplexed with the third information according to a third rule. In some embodiments, the transmission of operation 1042 is performed upon determining that the first physical channel resource having a first transmission priority being configured to include in one time slot of a radio frame a second information that conflicts with each of a plurality of physical channel resources being configured to include a respective information in one time sub-slot of the one time slot of the radio frame.

In some embodiments of the method of FIG. 10E, the first rule specifies that in the at least one time sub-slot the portion of the first information includes the portion of the second information corresponding to the at least one time sub-slot in response to: the first physical channel including a first number of available time-frequency resources within the at least one time sub-slot that is less than a second number of time-frequency resources needed for the third information of the at least one of the plurality of physical channel resources, and the first transmission priority of the first physical channel resource is higher than the second transmission priority of the at least one of the plurality of physical channel resources.

In some embodiments of the method of FIG. 10E, the second rule specifies that in the at least one time sub-slot the portion of the first information includes the third information of the at least one of the plurality of physical channel resources corresponding to the at least one time sub-slot in response to: the first physical channel including a first number of available time-frequency resources within the at least one time sub-slot that is less than a second number of time-frequency resources needed for the third information of the one of the plurality of physical channel resources, and the first transmission priority of the first physical channel resource is either lower than or is same as the second transmission priority of the at least one of the plurality of physical channel resources.

In some embodiments of the method of FIG. 10E, the third rule specifies that in the at least one time sub-slot the portion of the second information is multiplexed with the third information of the at least one of the plurality of physical channel resources in response to: the first physical channel including a first number of available time-frequency resources within the at least one time sub-slot that is greater than or equal to a second number of time-frequency resources needed for the third information. In some embodiments of the method of FIG. 10E, the respective information and the third information includes a hybrid automatic repeat request acknowledge (HARQ-ACK). In some embodiments of the method of FIG. 10E, the first physical channel resource includes a physical uplink shared channel (PUSCH) and the plurality of physical channel resources include a plurality of physical uplink control channels (PUCCHs).

FIG. 10F shows a sixth exemplary flowchart for performing a transmission on a physical channel resource. Operation 1052 includes performing a transmission of a first information on a first physical channel resource, where the first physical channel resource has a higher transmission priority than that of a second physical channel resource, and where the transmission is performed in response to the first physical channel resource being configured to include a second information that conflicts within a time period with the second physical channel resource being configured to include a third information. In some embodiments, the transmission of operation 1052 is performed upon determining that the first physical channel resource is configured to include a second information that conflicts within a time period with the second physical channel resource being configured to include a third information.

In some embodiments of the method of FIG. 10F, the first information includes either only the second information or the second information multiplexed with a channel occupancy time (COT) shared information included in the third information. In some embodiments of the method of FIG. 10F, the first information includes only the second information in response to a multiplexing option being unsupported or not configured. In some embodiments of the method of FIG. 10F, the first information includes the second information multiplexed with the COT shared information in response to a channel access priority type (CAPC) value included in the COT being lower than a pre-determined threshold value. In some embodiments of the method of FIG. 10F, the first physical channel resource includes a physical uplink control channel (PUCCH) and the second physical channel resource include a physical uplink shared channel (PUSCH).

In some embodiments of the method of FIG. 10F, the first information includes either only the second information or a component carrier group uplink control information (CG-UCI) included in the second information multiplexed with a hybrid automatic repeat request acknowledge (HARQ-ACK) included in the third information. In some embodiments of the method of FIG. 10F, the first information includes only the second information in response to a multiplexing option being unsupported or not configured. In some embodiments of the method of FIG. 10F, the first physical channel resource includes a physical uplink shared channel (PUSCH) and the second physical channel resource include a physical uplink control channel (PUCCH). In some embodiments of the method of FIG. 10F, the transmission is performed in an unlicensed spectrum.

Figure 11:
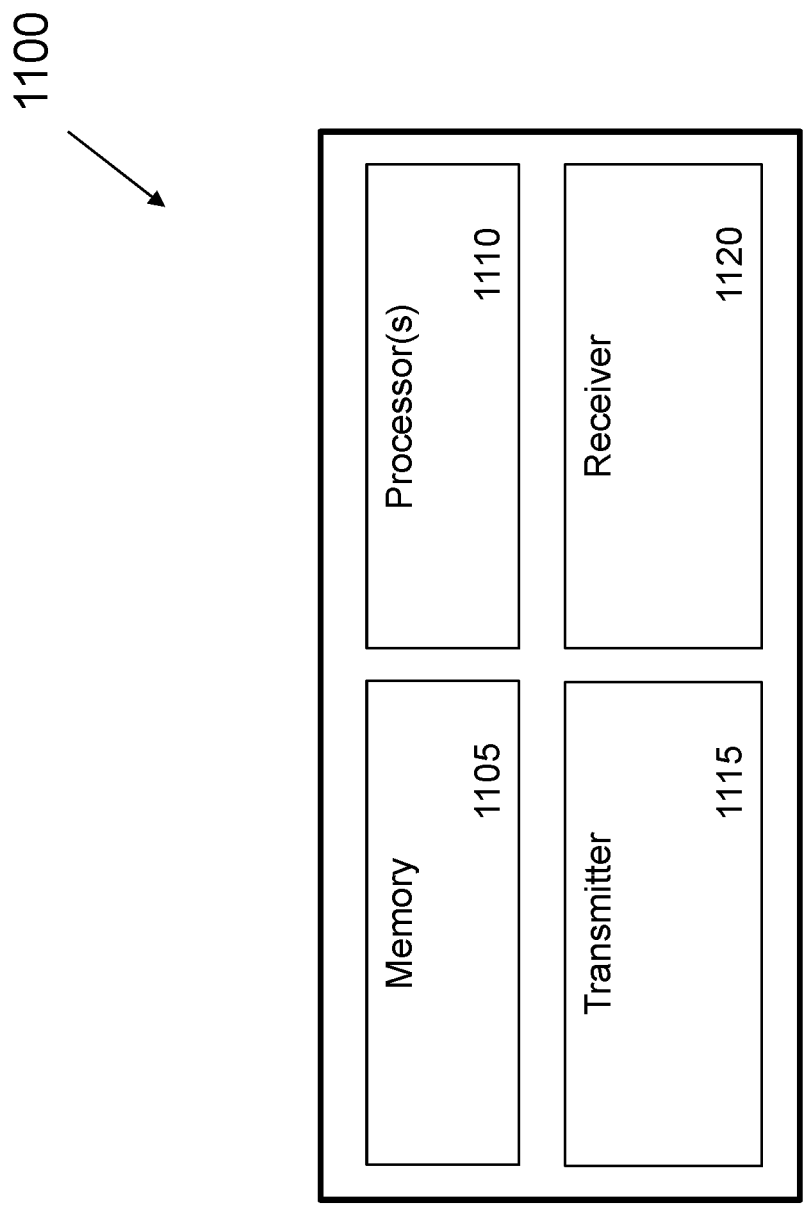
FIG. 11 shows an exemplary block diagram of a hardware platform that may be a part of a user equipment.

FIG. 11 shows an exemplary block diagram of a hardware platform 1100 that may be a part of a user equipment. The hardware platform 1100 includes at least one processor 1110 and a memory 1105 having instructions stored thereupon. The instructions upon execution by the processor 1110 configure the hardware platform 1100 to perform the operations described in FIGS. 2 to 10F and in the various embodiments described in this patent document. The transmitter 1115 transmits or sends information or data to another node. For example, a user equipment transmitter can send a message via PUCCH or PUSCH to a base station. The receiver 1120 receives information or data transmitted or sent by another node. For example, a user equipment can receive a message from a base station.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    performing a combined transmission of an uplink control information (UCI) multiplexed with a first information on a first physical channel resource,
        wherein the first physical channel resource has a low transmission priority that is lower than a high transmission priority of a second physical channel resource, and
        wherein the combined transmission is performed in response to the first physical channel resource being configured to include the first information that conflicts within a time period with the second physical channel resource being configured to include a second information that includes the UCI,
        wherein within the time period the second physical channel resource overlaps with at least some of the first physical channel resource to form an overlapping region within the time period,
        wherein the first physical channel includes a first number of available time-frequency resources within the overlapping region that is less than a second number of time-frequency resources needed for the UCI in the combined transmission,
        wherein a last symbol of a resource element (RE) occupied by the UCI in the combined transmission is not later in time than a last symbol of the second information to be carried by the second physical channel resource,
        wherein the first physical channel resource include a physical uplink shared channel (PUSCH) and the second physical channel resource includes a physical uplink control channel (PUCCH).

2. The method of claim 1, wherein the time period comprises one time slot of a radio frame.

3. An apparatus for wireless communication, comprising one or more processors configured to implement a method that causes the apparatus to:
    perform a combined transmission of an uplink control information (UCI) multiplexed with a first information on a first physical channel resource,
        wherein the first physical channel resource has a low transmission priority that is lower than a high transmission priority of a second physical channel resource, and
        wherein the combined transmission is performed in response to the first physical channel resource being configured to include the first information that conflicts within a time period with the second physical channel resource being configured to include a second information that includes the UCI,
        wherein within the time period the second physical channel resource overlaps with at least some of the first physical channel resource to form an overlapping region within the time period,
        wherein the first physical channel includes a first number of available time-frequency resources within the overlapping region that is less than a second number of time-frequency resources needed for the UCI in the combined transmission,
        wherein a last symbol of a resource element (RE) occupied by the UCI in the combined transmission is not later in time than a last symbol of the second information to be carried by the second physical channel resource,
        wherein the first physical channel resource include a physical uplink shared channel (PUSCH) and the second physical channel resource includes a physical uplink control channel (PUCCH).

4. The apparatus of claim 3, wherein the time period comprises one time slot of a radio frame.

5. A non-transitory computer readable program storage medium having code stored thereon, the code, when executed by a processor, causing the processor to implement a method, comprising:
    performing a combined transmission of an uplink control information (UCI) multiplexed with a first information on a first physical channel resource,
        wherein the first physical channel resource has a low transmission priority that is lower than a high transmission priority of a second physical channel resource, and
        wherein the combined transmission is performed in response to the first physical channel resource being configured to include the first information that conflicts within a time period with the second physical channel resource being configured to include a second information that includes the UCI,
        wherein within the time period the second physical channel resource overlaps with at least some of the first physical channel resource to form an overlapping region within the time period,
        wherein the first physical channel includes a first number of available time-frequency resources within the overlapping region that is less than a second number of time-frequency resources needed for the UCI in the combined transmission,
        wherein a last symbol of a resource element (RE) occupied by the UCI in the combined transmission is not later in time than a last symbol of the second information to be carried by the second physical channel resource,
        wherein the first physical channel resource include a physical uplink shared channel (PUSCH) and the second physical channel resource includes a physical uplink control channel (PUCCH).

6. The non-transitory computer readable program storage medium of claim 5, wherein the time period comprises one time slot of a radio frame.

* * * * *